July 17, 1951

R. STONE 2,560,996

GAUGE FOR RIP SAWS

Filed Jan. 26, 1950

Reuben Stone
INVENTOR.

BY *Clarence A. O'Brien
and Harvey B. Jacobson*
Attorneys

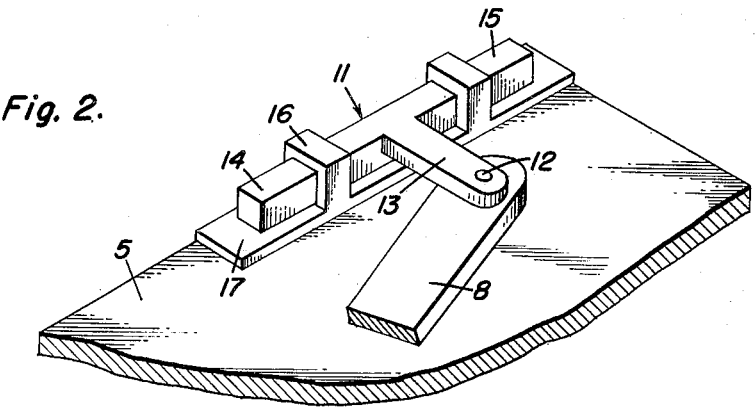
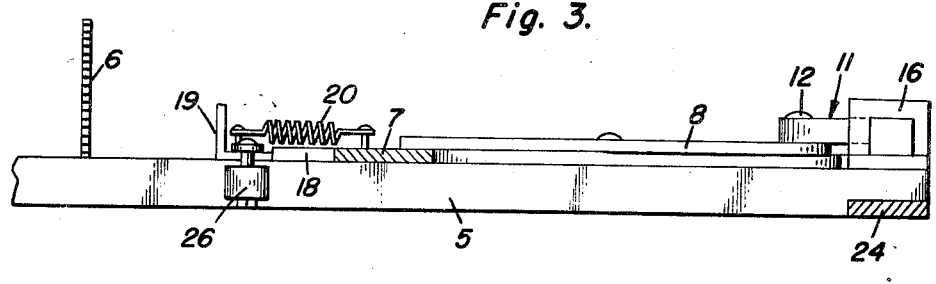
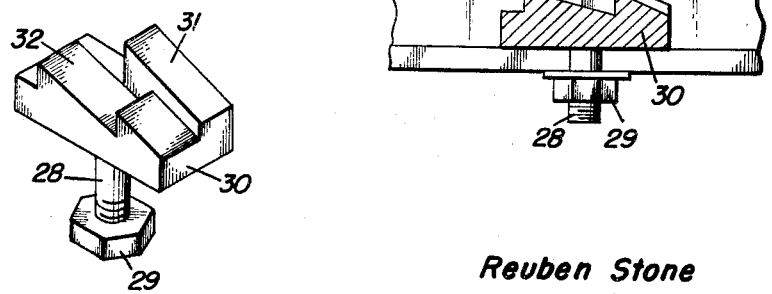

Patented July 17, 1951

2,560,996

UNITED STATES PATENT OFFICE 2,560,996

GAUGE FOR RIPSAWS

Reuben Stone, Hawkins, Wis.

Application January 26, 1950, Serial No. 140,571

2 Claims. (Cl. 143—175)

The present invention relates to new and useful improvements in gages for circular saws and more particularly to a gage bar mounted on a saw table for quick and easy adjustment relative to the saw for gaging the width of strips ripped from boards or planks.

An important object of the invention is to provide a novel connection for the gage bar with a pair of pivoted lazy tongs arms to automatically maintain a parallel relation between the gage bar and the saw during adjustment of the bar.

Another object is to provide lever adjusting means for the lazy tongs arms with an adjustable stop holding the lever in its adjusted position.

A still further object is to provide a device of this character of simple and practical construction, which is efficient and reliable in operation, relatively inexpensive to manufacture and install in operative position on a saw table, and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is an enlarged perspective view of the sliding connection for one of the lazy tongs arms;

Figure 3 is an enlarged sectional view taken on a line 3—3 of Figure 1;

Figure 4 is an enlarged perspective view of the adjustable stop, and

Figure 5 is an enlarged sectional view taken on a line 5—5 of Figure 1.

Figure 1:
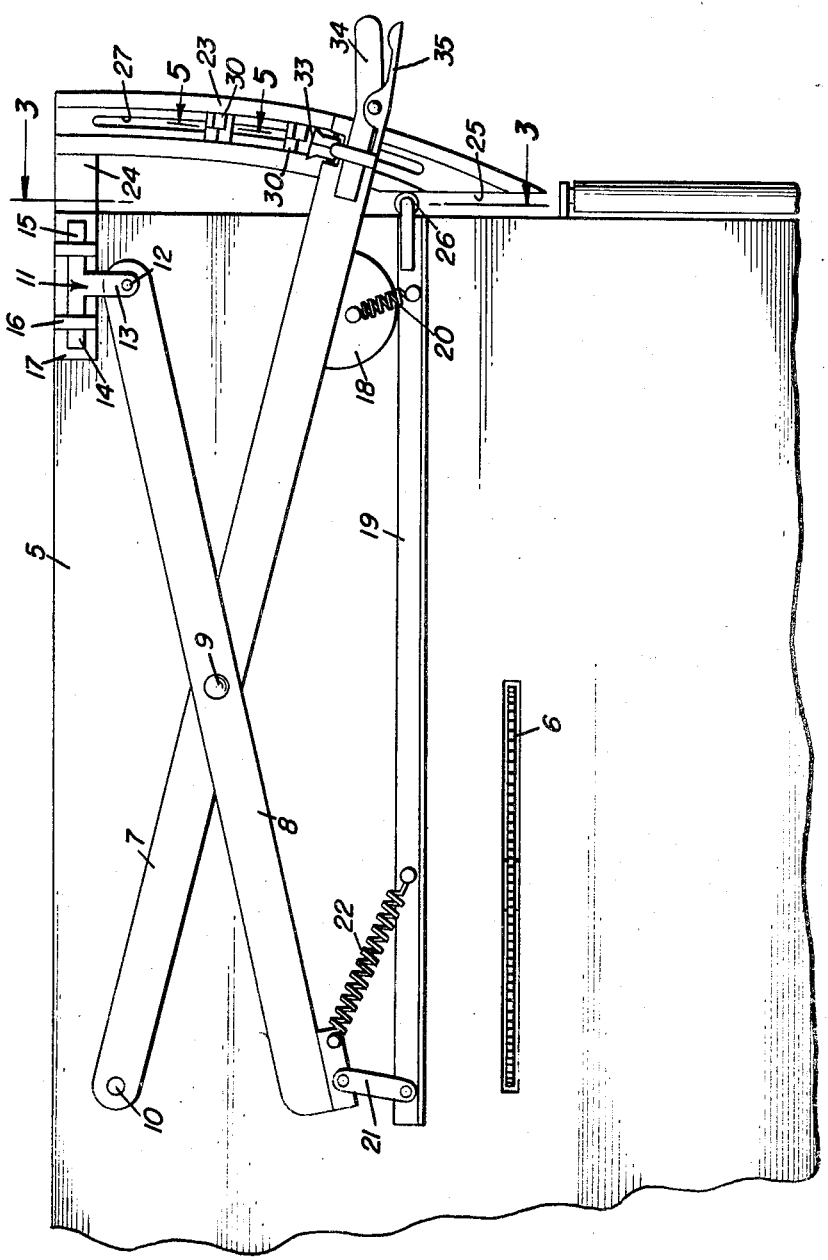
Figure 1 is a top plan view.

Referring now to the drawings in detail, wherein for the purpose of illustration I have disclosed a preferred embodiment of my invention, the numeral 5 designates a saw table for a circular saw 6 and on the table, at one side of the saw, is positioned a pair of arms 7 and 8 pivoted to each other at approximately a central portion by a pin 9 in a lazy tongs arrangement. Arm 7 is pivoted at one end to the table by a pin 10 and arm 8 is pivoted at one end to a T-shaped slide 11 by means of a pin 12 at the end of the stem portion 13 of the slide.

The arms 14 and 15 of the slide are slidable in guides 16 on an attaching plate 17 which is welded or otherwise suitably secured on the table at one end thereof.

The arm 7 is provided at one edge adjacent its free end with a semi-circular plate 18 against the rounded edge of which the rear edge of one end of a gage bar 19 is held by a coil spring 20. A link 21 pivotally connects the other end of gage bar 19 to the adjacent end of arm 8 and a coil spring 22 also connects gage bar 19 to arm 8 adjacent to link 21 and in diverging relation with respect thereto and in a direction toward bar 19 to hold the bar and link from idle swinging movement.

An arcuate arm 23 is rigidly secured at the end of table 5 by means of a bracket 24 to lie in a position co-planar with the table and with one end of the arm opposed to the edge of the table to form a track 25 for a roller 26 journaled at the adjacent end of gage bar 19 and traveling between the edge of the table and the opposed end of arm 23.

Arm 23 is also formed with an arcuate slot 27 in which a threaded stud 28 is adjustably secured by a nut 29 threaded on the lower end of the stud under arm 23 to hold a stop 30 at the upper end of the stud in adjusted position on top of the arm. Stop 30 is formed with a double set of staggered teeth 31 and 32 engaged by a double dog or pawl 33 pivoted on a handle 34 at the free end of arm 7. The dog 33 is released by a lever 35 pivoted to the handle.

In the operation of the device, handle 34 is moved along arcuate arm 23 to move arms 7 and 8 in a lazy tongs action to thus adjust gage bar 19 toward or away from saw 6. During the adjusting movement of the gage bar, roller 26 travels along the edge of table 5 and springs 20 and 22 hold the roller against the table 5 and also holds the gage bar against semi-circular abutment 18 and keeps link 21 from swinging idly, to thus maintain the gage bar parallel to saw 6 during its adjustment.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A saw gage for a saw table comprising a gage bar adjustable laterally over the table and relative to the saw, an end roller on said bar riding against one edge of the table to guide said bar during lateral adjustment thereof, a lazy tongs for adjusting said bar comprising a pair of arms pivoted together in crossed relation with one end of one arm pivoted to said table and one end of the other arm pivotally and slidably connected to the table whereby said lazy tongs is operated to move the other ends of said arms toward and from each other respectively, and means connecting said bar to said other ends of said arms for adjustment in opposite directions by movement of said other ends toward and from each other, said means compensating for movement of said other ends relative to said bar and comprising coil springs exerting tension against the bar in a longitudinal direction to pull the roller against said edge of the table.

2. A saw gage according to claim 1 wherein said means further comprises a link pivotally connecting said bar to one of said other ends, and an arcuate abutment on the other of said other ends slidably and rockably engaging said bar, said link and abutment maintaining said bar parallel with the saw and at a right angle to said edge of the table.

REUBEN STONE.

REFERENCES CITED

The following references are of record in the file of this patent:

UNITED STATES PATENTS

| Number | Name | Date |
|---|---|---|
| 282,213 | Neacy | July 31, 1883 |
| 326,454 | Rawlings | Sept. 15, 1885 |
| 904,342 | Loehr | Nov. 17, 1908 |
| 1,104,735 | Morris | July 21, 1914 |

FOREIGN PATENTS

| Number | Country | Date |
|---|---|---|
| 566,179 | France | Nov. 19, 1923 |